United States Patent

[11] 3,593,935

[72] Inventors Theodore Ritz, Jr.
3691 Whitfield, Waterford, Mich. 48095;
Joseph M. Richtarcik, 20021 Avalon, St. Clair Shores, Mich. 48079

[21] Appl. No. 684,373
[22] Filed Nov. 20, 1967
[45] Patented July 20, 1971

[54] ENDLESS LOOP TAPE CARTRIDGE
8 Claims, 5 Drawing Figs.

[52] U.S. Cl. 242/55.19, 226/194
[51] Int. Cl. B65h 17/48
[50] Field of Search 242/55.19, 55.19 A, 55.13, 55.18, 71.8; 226/181, 182, 187, 190, 194

[56] References Cited

UNITED STATES PATENTS

| | | | |
|---|---|---|---|
| 2,922,642 | 1/1960 | Cousino | 242/55.19 (A) |
| 3,326,484 | 6/1967 | Yefsky | 242/55.19 (A) |
| 3,350,025 | 10/1967 | Lear | 242/55.19 (A) |
| 3,350,028 | 10/1967 | Lear | 242/71.8 (A) |
| 3,406,923 | 10/1968 | Wolfner | 242/55.19 (A) |
| 3,424,360 | 1/1969 | Trott | 242/55.19 (A) |

FOREIGN PATENTS

| | | | |
|---|---|---|---|
| 424,301 | 5/1967 | Switzerland | 242/55.19 (A) |
| 1,042,025 | 9/1966 | Great Britain | 242/55.19 (A) |

Primary Examiner—Billy S. Taylor
Attorney—Howard C. Miskin

ABSTRACT: A magnetic tape cartridge houses an endless coiled tape with an exterior loop of tape extending from the inside convolution of the coil, past suitable guide means, over tape head pads and a pressure member disposed adjacent to openings in the front of the cartridge, to then return to the outer convolution of the coil. The coil is supported on a spool composed of a resilient washer or flange snapped over a series of annular projections on the lower portion of a concentric hub. A resilient plastic pressure means is pivotally mounted inside the cartridge and in one embodiment carries a pressure roller to engage and press the tape loop against a driven capstan to feed the tape. An alternate embodiment uses a reversely curved compression arm to press the tape against the capstan. When the cartridge is removed from the capstan the pressure roller or compression arm is arranged so as to press the tape against the edges of the adjacent cartridge opening.

INVENTORS

THEODORE RITZ JR.
JOSEPH M. RICHTARCIK

ENDLESS LOOP TAPE CARTRIDGE

Background of the Invention

The principal object of the invention is the provision of an improved endless loop tape cartridge which has superior features of construction to improve performance and reduce costs.

The foregoing object of the invention and its advantages will become apparent during the course of the following description, taken in conjunction with the accompanying drawing.

Detailed Description of the Preferred Embodiments

Figure 2:
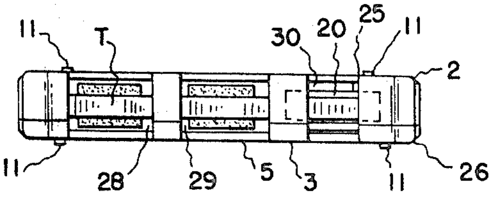
FIG. 2 is a front and elevational view of said cartridge.
Figure 1:
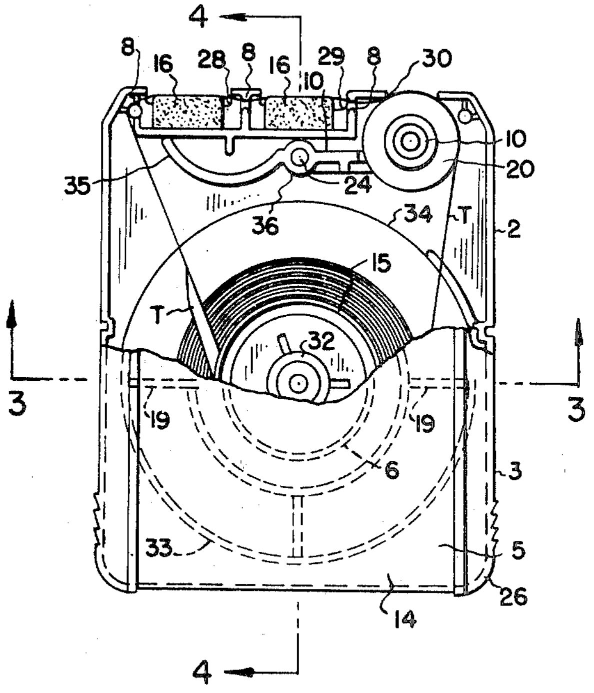
FIG. 1 is a top plan view with parts cut away of an improved endless loop tape cartridge embodying the invention.
Figure 4:
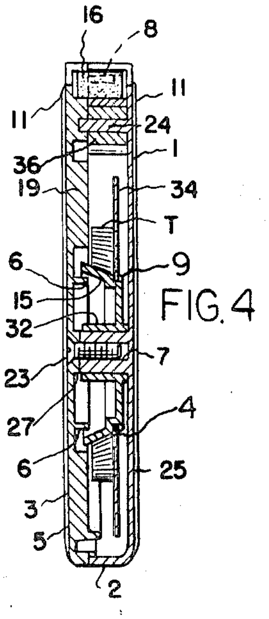
FIGS. 3 and 4 are, respectively, transverse and longitudinal sectional views of said cartridge taken along the lines 3—3 and 4—4, respectively, of FIG. 1.
Figure 3:
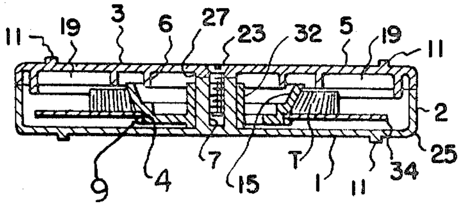

Referring to the drawing in greater detail, said cartridge comprises a housing having a base 25 and a removable cover 5. The base 25 has a bottom wall 1 and an outer peripheral upright wall 2. The cover 5 has a top wall 3 and an outer peripheral upright wall 26 which mates with the upright wall 2 to form the side and end walls of the assembled cartridge. The two cartridge halves are held together by means of a screw 23 the head of which is disposed in a boss 27 in the cover 5 and the shank of which is threaded into a boss 7 in the base 25 in the instance. The bosses 7 and 27 are drawn into abutting relationship by the screw 23 to place the cover 5 and the base 25 under slight compression. The front end of the cartridge has several openings such as 28 and 29 to accommodate the playback heads of the playback machine and such as 30 to accommodate the capstan of such machine. Such capstan engages an idler wheel 20 to linearly drive the tape T in its travel about its endless loop. The boss 7 serves as a bearing shaft for a hub 15 in the form of an inverted cone and having an annular seat 4 around its smallest outside diameter and a series of lateral projections 9 around the seat 4, in the instance, about which the endless loop tape T coils.

In the instance the hub 15 has a bushing portion 32 which bears against the inner surface of the bottom wall 1 to take up downward thrust on the hub 15 from the tape coil. A circular rib 6 which is concentrically disposed to the hub 15 projects into the confines of the hub 15 such that the upper peripheral portions of the latter is exterior to and vertically overlaps the former. The outside diameter of the rib 6 is maintained close enough to the inside diameter of the upper peripheral portions of the hub 15 so that with such projections of the rib 6 and exterior overlapping of the hub 15 the inner convolutes of the coiled tape are prevented from creeping over and into the interior of the hub 15 which otherwise would cause an overcenter lock of such creeped convolutes about the bushing portion 32 of the hub 15. The bosses 7 and 27 maintain the spacing between the walls 1 and 3 so that the hub 15 is freely rotatable about the boss 7 via its bushing portion 32. A resilient film washer 34 is supported by a series of lateral projections 9 formed around the annular seat 4 of the hub 15 and such lateral projections 9 form a supporting surface for the resilient film washer 34 of greater diameter than the annular seat 4 of the hub 15 such that the resilient film washer 34 snaps over the annular projections 9 and is freely rotatably about the annular seat 4 of the hub 15. In snapping over the projections 9 to reach its position on the hub 15 in the annular seat 4 the film washer 34 deforms slightly in the region of its inside diameter. Said resilient film washer 34 supports the coil of tape T in rotation allowing said tape T pay out from its innermost convolute to its outermost convolute. An outer concentric circular rib 33 on the cover 5 and projecting downwardly within close relationship to the resilient film washer 34 and of smaller inside diameter than the outside diameter of the film washer 34, encircles the coil of tape T in the rear portion of the assembled cartridge and maintains the tape T in an organized manner on the resilient film washer 34. An intermediate circular rib on the cover 5 together with radial ribs 19 aid in maintaining the coiled tape in an organized condition on the film washer 34. The radial ribs are integrally joined to said intermediate circular rib and to the outer circular rib 33. Mating vertical walls on the cover 5 and the base 25 form tape guide openings 8 at the front end of the cartridge which maintain the vertical position of the tape T on the playback heads or sensing devices of the playback machine. The openings 8 also maintain the tape T in a bowed position under tension about each such sensing device of the playback machine. Stacking runners 11 provide stacking means for the cartridges and form a label area 14. A resilient compression arm 10 having an arc 35 which exerts a springlike force that is transmitted through a bushing 36 which fits over a pintal 24 on the base 25, to the idler wheel 20 rotatably supported on the resilient compression arm 10 on the end opposite to the arc 35. The resilient compression arm 10 holds the idler wheel 20 in compressive contact to the capstan of the playback machine when the assembled cartridge is inserted into the playback machine thus supplying the driving force to move the tape T from its innermost convolute to its outermost convolute. The resilient compression arm 10 also acts as a brake to prevent the movement of tape T by trapping the tape T between the idler wheel 20 and the front walls 2 and 26 of the opening 30 when the cartridge is removed from the playback machine.

Figure 5:
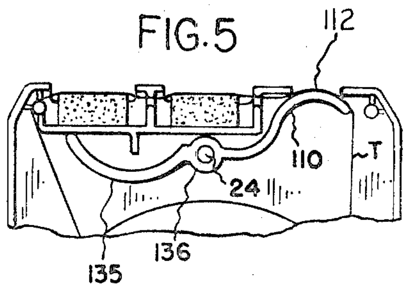
FIG. 5 is a fragmentary plan view similar to FIG. 1 showing a modification for the means to engage the drive capstan of the playback machine.

FIG. 5 discloses a resilient compression arm 110 which has a low friction contact curved surface 112 over which the tape T travels and which holds the tape T in driving engagement with the capstan of the playback machine. The resilient compression arm 110 consists of an arc 135 which acts in the same manner as the arc 35 of the resilient compression arm 10, a bushing 136 which fits over a pintal on the base 25 in the same manner as the bushing 36 of the resilient compression arm 10 and curved surface 112 on the opposite end of the bushing 136 to the arc 135. Said curved surface 112 holds the tape T in driving engagement with the capstan of playback machine and also acts as a brake in the same manner as previously described for the resilient compression arm 10. The resilient compression arm 110 has been found to reduce distortion in audio playback.

It will thus be seen that there has been provided by the present invention an endless loop tape cartridge in which the object together with many other thoroughly practical advantages has been successfully achieved. While a preferred embodiment of the invention has been shown and described it is to be understood that variations and changes may be resorted to without departing from the spirit of the invention as defined by the appended claims.

We claim:

1. A cartridge for an endless loop tape comprising a housing having a base, a shaft on the base, a hub rotatably mounted on the shaft, said hub having an integral bearing portion bearing against said shaft by which said hub stands upon said base, a resilient film washer for supporting a tape coil carried by and supported on the hub and capable of independent rotation in respect to said hub, said hub having therearound an annular seat, said film washer rotatably disposed in said annular seat, and lateral projecting means around the annular seat for securing the film washer on the hub.

2. The cartridge of claim 1 in which said film washer is assembled on the hub by being snapped over said lateral projecting means to dispose it in said annular seat.

3. The cartridge of claim 1 and said housing having a cover, a circular rib on the cover projecting inside the hub to prevent the tape from migrating inside the hub.

4. The cartridge of claim 3 and rib structure on the cover disposed radially outwardly of said first-mentioned circular rib and projecting toward the film washer to maintain the tape coil in an organized condition on the film washer, said rib structure including an outer circular rib which is disposed radially outwardly of the tape coil, said outer circular rib concentric to said first-mentioned circular rib.

5. The cartridge of claim 4, said rib structure further comprising a third concentric circular rib radially intermediate said first-mentioned and said outer circular ribs, said intermediate circular rib disposed above the tape coil and radially outwardly of said hub.

6. The cartridge of claim 1, said housing having a capstan opening therein, resilient means supported on the base and means biased thereby against said opening, the tape movable over said means biased against said opening and braked thereby against said opening.

7. A cartridge having an endless loop tape comprising a housing having a base and a cover, said housing having a capstan opening therein, said capstan opening having opposite edges, said base having an upright pivot post integral therewith, brake means including resilient plastic means pivotally supported on said base via said pivot post, said resilient means being slidable in respect to said pivot post, said brake means also including means biased by said plastic means against both said edges of said opening, said brake means being confined wholly between the inside surfaces of said cover and base, said tape being movable over and braked against both said edges of said opening by said means biased against said opening.

8. In a cartridge for an endless loop tape, a hub having an integral bearing portion for bearing against a shaft, a resilient film washer for supporting a tape coil carried by and supported on the hub and capable of independent rotation in respect to said hub, said hub having therearound an annular seat, said film washer rotatably disposed in said annular seat, and laterally projecting means around the annular seat for securing the film washer on the hub.